US008282525B2

(12) United States Patent
Oliver

(10) Patent No.: US 8,282,525 B2
(45) Date of Patent: Oct. 9, 2012

(54) ARRANGEMENT FOR CONTROL OF A CONTINUOSLY VARIABLE TRANSMISSION

(75) Inventor: Robert Andrew Oliver, Lancashire (GB)

(73) Assignee: Torotrak (Development) Limited, Leyland, Lancashire (GB)

( * ) Notice: Subject to any disclaimer, the term of this patent is extended or adjusted under 35 U.S.C. 154(b) by 687 days.

(21) Appl. No.: 12/308,199

(22) PCT Filed: May 11, 2007

(86) PCT No.: PCT/GB2007/050258
§ 371 (c)(1),
(2), (4) Date: May 19, 2009

(87) PCT Pub. No.: WO2007/141564
PCT Pub. Date: Dec. 13, 2007

(65) Prior Publication Data
US 2009/0318259 A1    Dec. 24, 2009

(30) Foreign Application Priority Data
Jun. 8, 2006 (GB) .................................. 0611265.0

(51) Int. Cl.
*F16H 15/38* (2006.01)
*F16H 61/66* (2006.01)
(52) U.S. Cl. ........................................... 476/10; 476/40
(58) Field of Classification Search .................. 476/2, 9, 476/10, 40
See application file for complete search history.

(56) References Cited

U.S. PATENT DOCUMENTS

| 1,861,303 | A | * | 5/1932 | De Yarman | ..................... 476/58 |
| 3,561,281 | A | * | 2/1971 | Wilfert | ......................... 74/473.3 |
| 4,434,676 | A | | 3/1984 | Horton | |
| 4,554,841 | A | * | 11/1985 | Okoshi | ........................... 476/10 |
| 4,752,278 | A | | 6/1988 | Falzoni | |
| 5,230,669 | A | | 7/1993 | Tervola | |

FOREIGN PATENT DOCUMENTS
GB 220331 A 5/1925
GB 415076 A 8/1934
(Continued)

OTHER PUBLICATIONS

PCT/GB2007/050258, International Search Report and Written Opinion, Mailed Jan. 11, 2008, 14 pages.
(Continued)

*Primary Examiner* — William C Joyce
(74) *Attorney, Agent, or Firm* — Blakely, Sokoloff, Taylor & Zafman LLP

(57) ABSTRACT

An arrangement for controlling a variator in a continuously variable transmission such as a vehicle transmission is described. The arrangement comprises a user operable ratio control part such as a lever and a device for operatively coupling the ratio control part to a movable torque transfer part of the variator such as its rollers. The coupling device is, in the particular embodiment described, a hydro-mechanical arrangement. By moving the user operable ratio control part, the user exercises control over the variator ratio. In accordance with the invention the arrangement further comprises a torque release device such as a valve which is operable by the user to decouple the ratio control part from the movable torque transfer part. By doing so, the torque release device offers functionality which is in some ways analogous to that of a clutch in a conventional stepped ratio vehicle transmission.

9 Claims, 3 Drawing Sheets

FOREIGN PATENT DOCUMENTS

| | | |
|---|---|---|
| GB | 1 367 525 A | 9/1974 |
| GB | 1 494 128 A | 12/1977 |
| GB | 2 177 765 A | 1/1987 |
| GB | 2 312 257 A | 10/1997 |

OTHER PUBLICATIONS

PCT/GB2007/050258, International Preliminary Report on Patentability and Written Opinion, Mailed Dec. 10, 2008, 8 pages.

Patents Act 1977: Examination Report under Section 18(3) for United Kingdom Counterpart Application No. GB0611265.0, 3 pgs. (Sep. 27, 2006).

PCT Invitation to Pay Additional Fees for PCT Counterpart Application No. PCT/GB2007/050258 Containing Communication Relating to the Results of the Partial International Search Report, 7 pgs. (Aug. 10, 2007).

* cited by examiner

ARRANGEMENT FOR CONTROL OF A CONTINUOSLY VARIABLE TRANSMISSION

CROSS REFERENCE TO RELATED APPLICATIONS

This patent application is a U.S. National Phase application under 35 U.S.C. §371 of International Application No. PCT/GB2007/050258, filed on May 11, 2007, entitled ARRANGEMENT FOR CONTROL OF A CONTINUOUSLY VARIABLE TRANSMISSION, which claims priority to United Kingdom patent application number 0611265.0 filed Jun. 8, 2006.

FIELD

The present invention is concerned with control of continuously, variable transmissions.

BACKGROUND

A conventional motor vehicle transmission with a manual, stepped ratio gearbox typically has a user operable clutch between the engine and the gearbox serving to couple/decouple them. When the vehicle is launched—that is, when it moves away from rest—there is an inevitable initial mismatch of speeds between the transmission input and the engine output, and by allowing the clutch to slip at this stage the driver causes torque to be applied to the transmission to accelerate the vehicle, without applying an unsustainable load to the engine that would cause it to stall. In the case of conventional automatic, stepped ratio transmissions the initial mismatch of speeds is accommodated by a torque converter. The clutch and torque converter are examples of what will be referred to herein as "launch devices".

In some continuously variable transmissions ("CVTs") no launch device is required. Instead, such CVTs are able to provide an infinite speed reduction. That is to say, by adjustment of ratio and without physically decoupling the engine from the transmission output, they can achieve a condition in which the transmission output is stationary while the engine is running. This condition is referred to as "geared neutral". Launch can be achieved simply by moving the CVT ratio away from geared neutral, and it is not necessary to decouple the transmission from the engine to bring the vehicle to a halt.

The inventors have recognised, however, that it would be advantageous if such a transmission could be made to emulate in some respects the functionality of a manual transmission having a user operable clutch. The use of a clutch is very familiar to many drivers. It offers positive assurance that no creep torque will be applied to the vehicle wheels. It is also useful e.g. in certain low speed manoeuvres.

Note that the word "engine" is used herein for the sake of brevity to refer to any form of rotary driver, and must be understood to encompass not only internal combustion engines but also electric motors, external combustion engines etc.

The word "variator" will be used herein to refer to a device that has a rotary input and a rotary output and that transfers drive from one to the other at drive ratio that can be continuously varied. Such a device is to be found in any CVT. Most, if not all, variators have some movable torque transfer part which is involved in the transfer of drive and whose position corresponds to the variator ratio. In the well known case of a toroidal race, rolling traction type variator, rollers serve as the movable torque transfer parts. They transmit drive from one toroidally recessed race to another, and their motion involves a change in roller inclination which is associated with a change in variator drive ratio. A force is applied to the movable torque transfer part to influence its position, and so to influence variator drive ratio. In principle, this force could be provided through some direct linkage to a user operable control such as a lever or foot pedal. In practice, excepting the case of very lightweight vehicles, the force required—which is related to the torques suffered by the variator—proves to be too large to be comfortably provided by the user. Achieving geared neutral with such an arrangement could also be problematic, since any minor deviation of the position of the torque transfer part from the position required for geared neutral would cause the transmission to adopt a very low drive ratio, potentially resulting in a large "creep torque", albeit at low wheel speed.

Modern CVTs are typically reliant upon sophisticated electronic controllers to regulate the engine and the transmission. However there is a commercial need for simple physical devices for controlling CVTs. These would be particularly attractive for use in basic model tractors, for example.

SUMMARY

In accordance with a first aspect of the present invention there is an arrangement for controlling a variator, the arrangement comprising a user operable ratio control part, a device for operatively coupling the ratio control part to a movable torque transfer part of the variator to enable the user to exercise control over the variator ratio, and a torque release device operable by the user to decouple the ratio control part from the movable torque transfer part.

The ratio control part may for example be a foot pedal or lever operable by the user. The operative coupling of the ratio control part to the torque transfer part is preferably such that the position of the torque transfer part is determined by the position of the ratio control part.

In accordance with a second aspect of the present invention there is an arrangement for controlling a variator, the arrangement comprising a user operable ratio control part, a device for operatively coupling the ratio control part to a movable torque transfer part of the variator to enable the user to exercise control over the variator ratio, and a device for applying to the ratio control part a force which varies in sympathy with force experienced by the movable torque transfer part.

BRIEF DESCRIPTION OF THE DRAWINGS

Specific embodiments of the present invention will now be described, by way of example only, with reference to the accompanying drawings, in which: —

DETAILED DESCRIPTION

Figure 1:
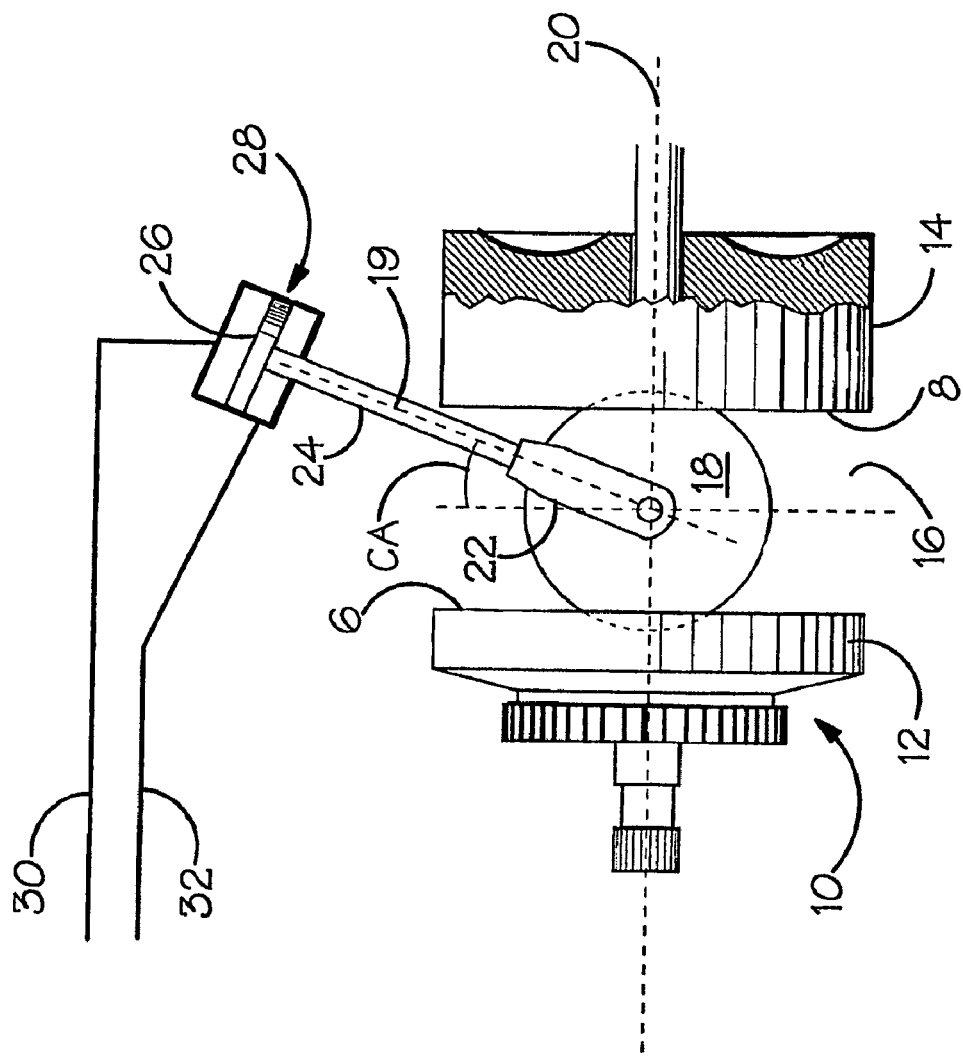
FIG. 1 is a highly simplified and schematic representation of a variator suitable for use in implementing the present invention.

FIG. 1 represents a variator of the well known toroidal race, rolling traction type. The present invention has been developed in connection with a CVT using this type of variator, which is particularly well suited to the purpose, but in principle variators of other types could be used.

The variator 10 comprises co-axially mounted input and output races 12, 14, adjacent faces 6, 8 of which are semitoroidally recessed and together define a generally toroidal cavity 16 containing a movable torque transfer part in the form of a roller 18. In fact a practical variator typically has two or three such rollers spaced about the cavity 16 at circumferential intervals. Each roller 18 runs upon the faces 6, 8 of the respective races 12, 14 and so serves to transmit drive from one to the other. The roller 18 is able to move back and forth along a circumferential direction about the common axis 20 of the races 12, 14. It is also able to precess. That is, the roller's axis is able to turn, changing the inclination of the roller axis to the disc axis. In the illustrated example, these motions are provided for by rotatably mounting the roller 18 in a carrier 22 coupled by a stem 24 to a piston 26 of an actuator 28. A line 19 from the centre of the piston 26 to the centre of the roller 18 constitutes a precession axis about which the whole assembly can turn. Precession of the roller results in changes of the radii of the paths traced upon the races 12, 14 by the roller, and hence in a change of variator drive ratio.

Note that in this example the precession axis 19 does not lie precisely in a plane perpendicular to the common axis 20, but is instead inclined to this plane. The angle of inclination is labelled CA in the drawing, and is known as the "castor angle". As the roller moves back and forth it follows a circular path centred upon the common axis 20. Furthermore the action of the races 12, 14 upon the roller creates a steering moment which tends to maintain it at such an inclination that the roller axis intersects the common axis 20. This intersection of the axes can be maintained, despite movement of the roller back and forth along its circular path, by virtue of the castor angle. As the roller moves along its path, it is also steered by the action of the races, causing it to precess such as to maintain the intersection of the axes. The result is that the position of the roller along its path corresponds to a certain roller inclination and hence to a certain variator drive ratio.

The actuator 28 receives opposed hydraulic fluid pressures through lines 30, 32. The force thus created by the actuator 28 urges the roller along its circular path about the common axis 20, and at equilibrium it is balanced by forces exerted upon the roller by the races 12, 14. The force exerted by the races is proportional to the sum of the torques externally applied to the variator races. This sum—the variator input torque plus the variator output torque—is the net torque that must be reacted to the variator's mountings, and is referred to as the reaction torque.

Figure 2:
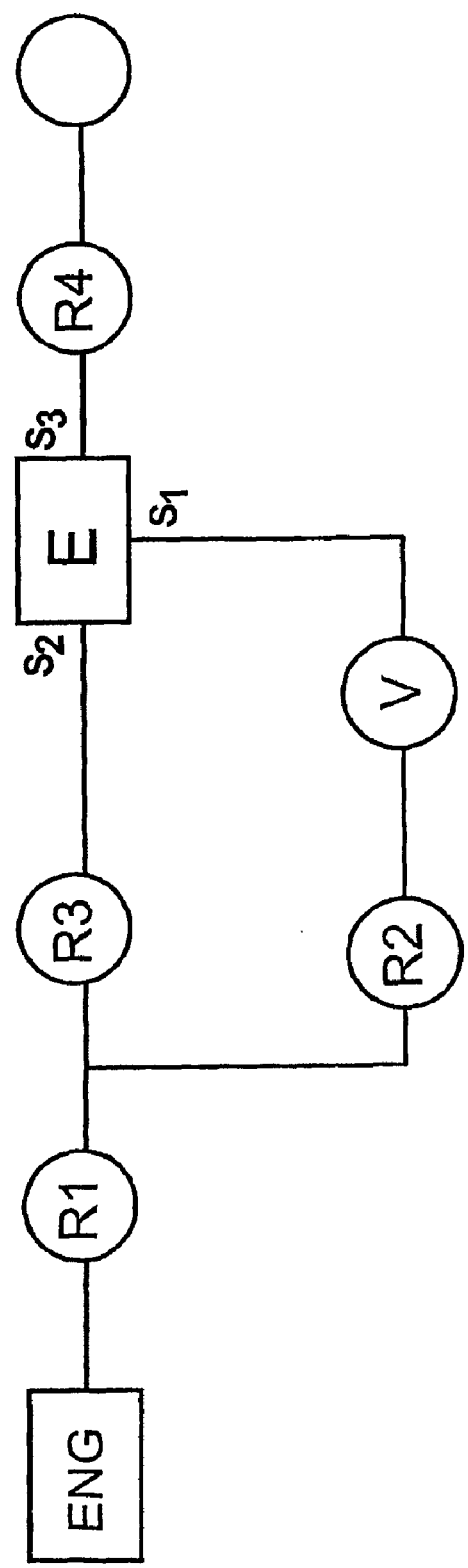
FIG. 2 is a schematic representation of a CVT suitable for use in implementing the present invention.

Looking now at FIG. 2, an engine is represented by a box ENG, the variator by a circle V and an epicyclic shunt gear by a box E. The variator input is coupled to the engine through gearing R1, R2. Its output is coupled to a first input shaft S1 of the epicyclic shunt E. A second input shaft S2 of the epicyclic shunt E is coupled through fixed ratio gearing R1, R3 to the engine. An output shaft S3 of the epicyclic shunt E is coupled through gearing R4 to the point of power usage, in this case wheels W of a motor vehicle. The operation and construction of epicyclic gear is very well known. The speed of the output shaft S3 can be expressed as a function of the speeds of the input shafts S1, S2. At some variator drive ratio, the speeds of S1 and S2 cancel each other out and the output speed at S3 is zero whatever the speed of the engine. This is the "geared neutral" condition referred to above. Variator drive ratios to one side of geared neutral produce S3 output rotation in one direction and variator drive ratios to the other side of geared neutral produce S3 output rotation in the opposite direction.

Thus by adjusting the variator drive ratio, it is possible to move from forward drive, through geared neutral to reverse.

A control arrangement embodying the present invention will now be described with reference to FIG. 3, in which the variator's control actuator and piston are once more labelled 28 and 26 respectively. The arrangement serves to control the hydraulic pressures applied to the actuator which in turn control variator ratio.

A user operative ratio control part is seen at 50 in the drawing. The ratio control part is operatively coupled to the variator rollers. The user moves this part to control the ratio adopted by the variator and hence by the transmission as a whole. The variator ratio is a function of the position of the ratio control part. The ratio control part is movable through a continuous range, indicated by arrows in the drawing, from a maximum forward ratio position through a geared neutral position to a maximum reverse ratio position. The range of ratios in forward and reverse will typically be different, making higher outputs speeds available in forward than in reverse. The ratio control part is in this embodiment formed by a hand lever. It could alternatively be a pedal. Pedal mechanisms are known in which the driver, using both the ball and heel of the foot, can rock the pedal to either side of a neutral position. These would be well suited in this context, but an alternative would be to give the driver two pedals—one for forward drive and one for reverse.

The device used to operatively couple the ratio control part to the variator rollers is seen in the drawing and is hydro-mechanical. To briefly summarise its main components, it uses a comparator arrangement 52 which receives and compares (a) the position of the ratio control part and (b) the position of the variator rollers, and in response modulates a force to move the rollers toward the position dictated by the user through the ratio control part. This force is provided through a hydraulic pressure control arrangement 54 supplying fluid pressure to the actuator 28. The device also serves to apply a feedback force, indicative of variator torque, to the ratio control part, to provide the user with information about torque. This is done through a force feedback arrangement 56. The user is provided with a torque release control 58 which, acting through a torque release device 60, serves to operatively decouple the ratio control part 50 from the variator and so to zero variator reaction torque, thereby providing functionality which is in some ways similar to that provided by a clutch in a conventional manual transmission.

These aspects will now be described in more detail, beginning with the comparator arrangement 52.

In the present embodiment the comparator uses a system of mechanical levers. The lever forming the ratio control part 50 is pivoted about a fixed fulcrum 62 and extends beyond the fulcrum to a pivotal link with a bridging part 64, which in turn has a first pivotal comparator linkage 65 to a comparator bar 66. Hence moving the ratio control part 50 moves the comparator bar's first comparator linkage 65.

The piston 26 is in the present embodiment coupled to the comparator bar through a cable linkage 68 and a feedback torque device 70 (the function of the feedback torque device 70 will be described below). The feedback torque device is pivotally coupled to the comparator bar 66 through a second comparator linkage 72. Hence the position of the second comparator linkage corresponds to the position of the variator roller, and so to the variator ratio.

Between the first and second comparator linkage 65, 72, the comparator bar 66 has a reference linkage 74 to a valve control bar 76 leading in turn to a pressure control valve 78.

The effect of the lever arrangement is to set the state of the pressure control valve 78 on the basis of a comparison of variator ratio against the position of the ratio control part 50.

The pressure control valve 78 forms part of the pressure control arrangement 54. It has a port which receives pressurised fluid through fluid line 80 from a pump 82. The pump 82 draws from a sump 84 and is provided with a pressure relief valve 86. The pressure control valve has ports communicating with two supply lines S1, S2 arranged to supply fluid respectively to opposite sides of the variator piston 26. Pressure in S1 urges the piston 26 one way. Pressure in S2 urges it the other way. The pressure control valve 78 is a proportional valve with three states. In one, it applies pressurised fluid from a pump to S1. In another it applies the pump fluid to S2. In the third, intermediate, state, it isolates S1 and S2 from the pump pressure.

Consider what happens when, the system having been in a state of equilibrium, the user moves the ratio control part 50. This produces a mismatch between the control part's position and the variator ratio. The first comparator linkage 65 is moved. In this example, let us take it the movement is to the left as viewed. The reference linkage 74 is thus also moved leftward, causing the pressure control valve to adopt its second state, applying pump pressure to S2 and venting S1 to the sump. Resultant pressure on piston 26 urges it to the left, as viewed, moving the piston and changing variator ratio. This motion is transmitted through the cable linkage 68, moving the second comparator linkage to the right. When this rightward motion of the second comparator linkage is sufficient to cancel out the leftward motion of the first comparator linkage, the pressure control valve 78 returns to its third position to maintain the piston pressure and position.

This is in effect a servo system for control of roller position using hydraulic actuation and mechanical position feedback.

The user is in principle able to demand any ratio at any moment, and this can create difficulties. A very rapid change in the demanded ratio could result for example in excessive wheel torque. The system has been developed in connection with agricultural vehicles having low transmission ratios and high engine torques, and in this context it is entirely possible through incautious user input to cause the vehicle to ride up on two wheels, with its steering wheels in the air! To provide the user with information about the torques being created in the transmission, the force feedback arrangement 56 applies to the user operative ratio control part a force which corresponds to torque. As FIG. 3 shows, the force feedback arrangement comprises a double acting arrangement of a piston 88 and cylinder 90. To opposite sides of the piston are applied pressures taken directly from respective supply lines S1, S2. The force thereby applied to the ratio control part is thus proportional to the force applied to the variator rollers by the variator piston 26, although by suitable choice of piston areas it is ensured that the former is smaller than the latter. As explained above, the force on the variator rollers is proportional to the variator reaction torque so the user experiences a feedback force which is directly related to reaction torque.

Turning now to the torque release control 58, this may for example be a hand lever or foot pedal. By use of the control 58, the driver is able to set to zero the force applied to the variator rollers. In this way variator reaction torque is likewise set to zero, and the variator is rendered incapable of sustaining an output torque to drive the vehicle wheels. The effect is akin to declutching in a conventional manual transmission, in that it prevents the transmission from applying torque to the vehicle wheels, but is achieved without any physical decoupling of the engine from the wheels. Instead it relies upon operatively decoupling the variator rollers from the ratio control part 50. The torque release control part 58 acts upon a torque release device 60 formed in this embodiment as a torque release valve leading from one fluid supply line S1 to the other S2. When open, the valve provides a route for equalisation of pressures in the supply lines. With little or no pressure difference across the piston, no significant force is applied to the variator rollers and so no significant reaction torque can be sustained. Closing the torque release valve 60 restores reaction torque. The valve 60 is a proportional valve so that the user can adjust its degree of opening.

The torque release control can be used analogously to the type of launch device described above, by first setting the ratio control part 50 to demand forward or reverse drive and then progressively closing the torque release valve 60 to bring the ratio in a controlled manned to the demanded value, causing the vehicle to accelerate away from rest. The torque release control can be used to gently "inch" the vehicle toward a desired position, as when parking. In this case it serves to limit the wheel torque, again in a manner very much akin to the conventional clutch. The torque release control can also be used to release any creep torque, e.g. when the vehicle is parked with the engine running. Note however that the user can also control the transmission without use of this control. For example, he/she can "shuttle" from forward to reverse and vice versa using only the ratio control part 50.

The feedback torque device 70 has yet to be described. It serves to modify variator ratio based upon reaction torque. It comprises a cylinder 91 which is movable by the cable linkage 68 and which contains a piston 92 connected through a bridging part 94 to the second comparator linkage 72. Within the cylinder 91 are springs on either side of the piston 92, biasing it toward a certain position. The forces applied to the piston in controlling the pressure control valve 78 are not large, and the springs are stiff enough that little if any movement of the piston 92 in its cylinder is created by these forces. However the piston is also subject, via a shutoff valve 96, to the S1/S2 pressures. The result is that a sufficient reaction torque—and correspondingly a sufficient difference in the S1 and S2 pressures—causes the piston to move against the springs, changing the effective length of the linkage from the cable 68 to the comparator bar 66. The effect is to modify variator ratio in a manner that reduces reaction torque, giving the system some compliance and protection against excessive torque. The shutoff valve removes this facility, by isolating the feedback torque device from the S1/S2 pressures, when it is not required.

Figure 3:
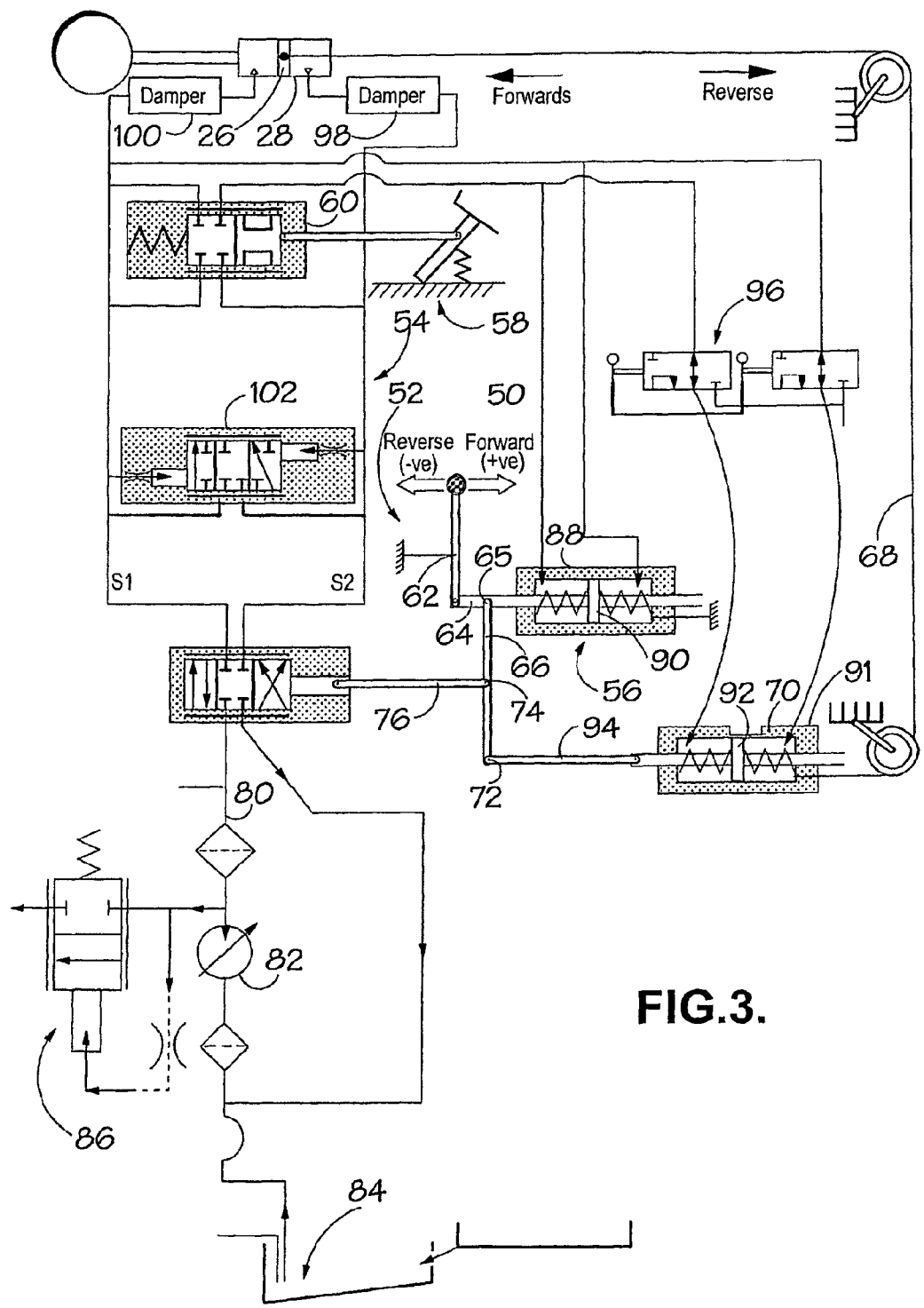
FIG. 3 is a schematic representation of a control arrangement embodying the present invention.

Items 98 and 100 in FIG. 3 are hydraulic dampers. Their function is to damp unwanted oscillatory behaviour of the variator by providing some resistance to flow into/out of the piston 28. Item 102 is a crossover valve used to reverse pressures applied to the variator for overrun conditions.

The above described embodiment serves as an example only of a possible implementation of the present invention. Numerous other ways of putting the invention into practice are possible. As an example, the lever arrangement used to compare roller position and demanded ratio could be replaced by a known type of valve in which the spool and sleeve are movable by the rollers and the ratio control part.

What is claimed is:

1. An arrangement for controlling a variator, the arrangement comprising a user operable ratio control part, a device for operatively coupling the ratio control part to a movable torque transfer part of the variator to enable the user to exercise control over the variator ratio, and a torque release device operable by the user to decouple the ratio control part from the movable torque transfer part, wherein the operative coupling of the user operable ratio control part to the movable torque transfer part is through a device comprising a comparator constructed and arranged to compare the position of the movable torque transfer part to the position of the ratio control part and to modulate a force applied to the movable torque transfer part based upon the outcome of the comparison.

2. An arrangement as claimed in claim 1 in which the user operable control part is a hand lever or foot pedal.

3. An arrangement as claimed in claim 1 in which the comparator is operatively coupled to a pressure control valve to modulate a pressure applied to a hydraulic actuator to create the force applied to the movable torque transfer part.

4. An arrangement as claimed in claim 1 in which the position of the movable torque transfer part is controlled using a hydraulic actuator which receives a hydraulic control pressure and the torque release device comprises a torque release valve arranged to vent the said hydraulic control pressure.

5. An arrangement as claimed in claim 4 in which the hydraulic actuator is double acting and receives first and second hydraulic control pressures through first and second supply lines, the difference in the control pressures determining a force applied to the movable torque transfer part, the torque release valve being connected across the supply lines so that opening it equalises pressure in them.

6. An arrangement as claimed in claim 1 in which the torque release device serves to relieve a control force applied to the movable torque transfer part.

7. A continuously variable transmission (CVT) comprising an arrangement and a variator, wherein the arrangement is for controlling the variator, the arrangement comprising a user operable ratio control part, a device for operatively coupling the ratio control part to a movable torque transfer part of the variator to enable the user to exercise control over the variator ratio, and a torque release device operable by the user to decouple the ratio control part from the movable torque transfer part, and wherein the operative coupling of the user operable ratio control part to the movable torque transfer part is through a device comprising a comparator constructed and arranged to compare the position of the movable torque transfer part to the position of the ratio control part and to modulate a force applied to the movable torque transfer part based upon the outcome of the comparison.

8. A CVT as claimed in claim 7 in which the variator is constructed and arranged to create a reaction torque which is a function of a force applied to its movable torque transfer part, and the torque release device serves to relieve the said force and so prevent the variator from sustaining a reaction torque.

9. A CVT as claimed in claim 7 in which the variator is a toroidal race, rolling traction variator having at least two races between which drive is transferred at continuously variable drive ratio by at least one roller, the roller being the movable torque transfer part.

* * * * *